United States Patent
Biskeborn et al.

(10) Patent No.: US 9,704,516 B2
(45) Date of Patent: Jul. 11, 2017

(54) SHORTING-RESISTANT CURRENT PERPENDICULAR TO PLANE SENSORS

(71) Applicant: International Business Machines Corporation, Armonk, NY (US)

(72) Inventors: Robert G. Biskeborn, Hollister, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/954,927

(22) Filed: Nov. 30, 2015

(65) Prior Publication Data

US 2017/0154642 A1   Jun. 1, 2017

(51) Int. Cl.
| | |
|---|---|
| G11B 5/127 | (2006.01) |
| G11B 5/39 | (2006.01) |
| G11B 5/008 | (2006.01) |
| G11B 15/46 | (2006.01) |

(52) U.S. Cl.
CPC ........ G11B 5/3912 (2013.01); G11B 5/00813 (2013.01); G11B 5/1278 (2013.01); G11B 15/46 (2013.01)

(58) Field of Classification Search
None
See application file for complete search history.

(56) References Cited

U.S. PATENT DOCUMENTS

| | | | | |
|---|---|---|---|---|
| 6,344,951 B1* | 2/2002 | Sato | ............... | G11B 5/3166 360/316 |
| 7,355,821 B2* | 4/2008 | Suda | ............... | G11B 5/1272 360/323 |
| 9,001,463 B2* | 4/2015 | Biskeborn | ............ | G11B 5/0083 360/121 |
| 9,384,764 B1* | 7/2016 | Biskeborn | ................ | G11B 5/40 |
| 9,406,319 B1* | 8/2016 | Biskeborn | ............ | G11B 5/3143 |
| 2002/0024764 A1* | 2/2002 | Takeya | .................... | G11B 5/255 360/122 |
| 2003/0026049 A1* | 2/2003 | Gill | ....................... | B82Y 10/00 360/324.12 |
| 2004/0145835 A1* | 7/2004 | Gill | ....................... | B82Y 10/00 360/314 |
| 2005/0280957 A1* | 12/2005 | Gill | ....................... | B82Y 10/00 360/324.12 |
| 2007/0047146 A1* | 3/2007 | Biskeborn | ............ | G11B 5/4893 360/240 |
| 2008/0030886 A1* | 2/2008 | Biskeborn | ............ | G11B 5/265 360/75 |
| 2009/0059437 A1* | 3/2009 | Gill | ....................... | B82Y 25/00 360/314 |
| 2014/0063646 A1* | 3/2014 | Biskeborn | ............ | G11B 5/0083 360/75 |

OTHER PUBLICATIONS

Biskeborn et al. U.S. Appl. No. 14/534,098, filed Nov. 5, 2014.

* cited by examiner

*Primary Examiner* — Will J Klimowicz
(74) *Attorney, Agent, or Firm* — Zilka-Kotab, P.C.

(57) ABSTRACT

In one general embodiment, an apparatus includes a current perpendicular to plane magnetic read transducer having a sensor and only a single magnetic shield. In another general embodiment, an apparatus includes a magnetic read transducer having a sensor, a first magnetic shield, and a second magnetic shield. A portion of the second magnetic shield aligned with the sensor in an intended direction of tape travel thereacross has a thickness along the intended direction that is about 50% or less than a thickness of a portion of the first magnetic shield aligned in the intended direction with the portion of the second magnetic shield.

11 Claims, 9 Drawing Sheets

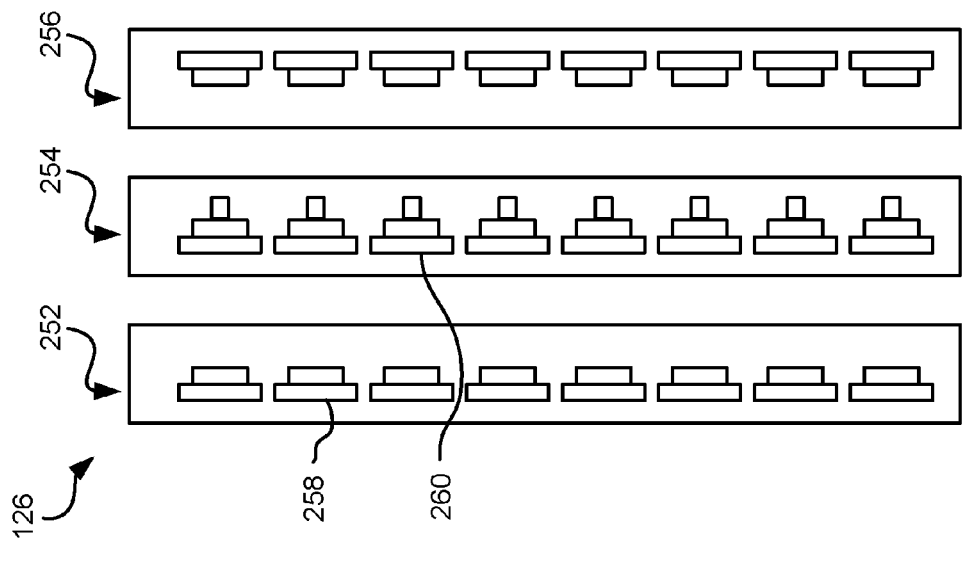
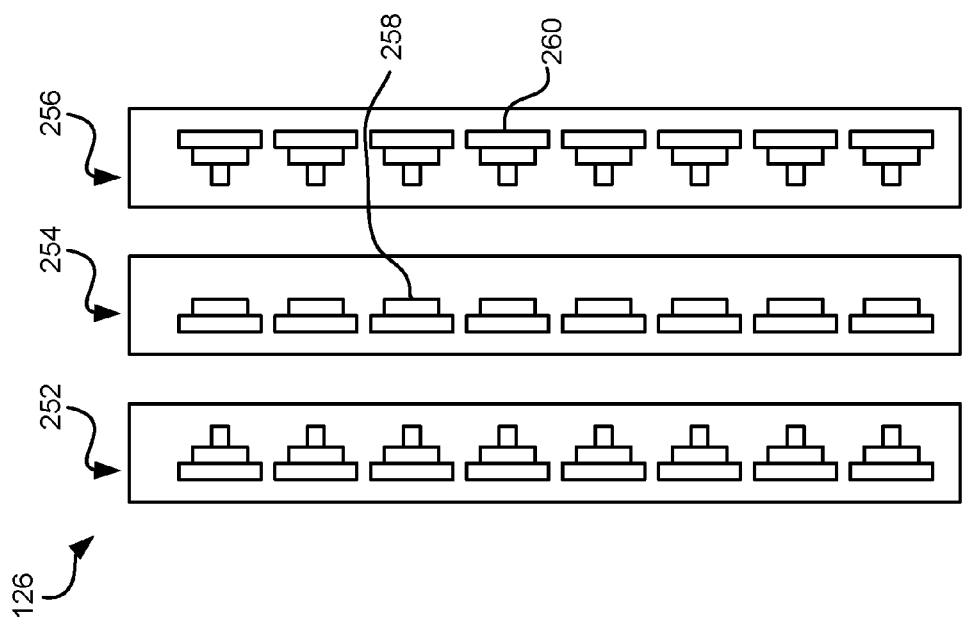

SHORTING-RESISTANT CURRENT PERPENDICULAR TO PLANE SENSORS

BACKGROUND

The present invention relates to data storage systems, and more particularly, this invention relates to preventing shorting failures of read transducers.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

An apparatus according to one embodiment includes a current perpendicular to plane magnetic read transducer having a sensor and only a single magnetic shield.

An apparatus according to another embodiment includes a magnetic read transducer having a sensor, a first magnetic shield, and a second magnetic shield. A portion of the second magnetic shield aligned with the sensor in an intended direction of tape travel thereacross has a thickness along the intended direction that is about 50% or less than a thickness of a portion of the first magnetic shield aligned in the intended direction with the portion of the second magnetic shield.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a current perpendicular to plane magnetic read transducer having a sensor and only a single magnetic shield.

In another general embodiment, an apparatus includes a magnetic read transducer having a sensor, a first magnetic shield, and a second magnetic shield. A portion of the second magnetic shield aligned with the sensor in an intended direction of tape travel thereacross has a thickness along the intended direction that is about 50% or less than a thickness of a portion of the first magnetic shield aligned in the intended direction with the portion of the second magnetic shield.

Figure 1A:
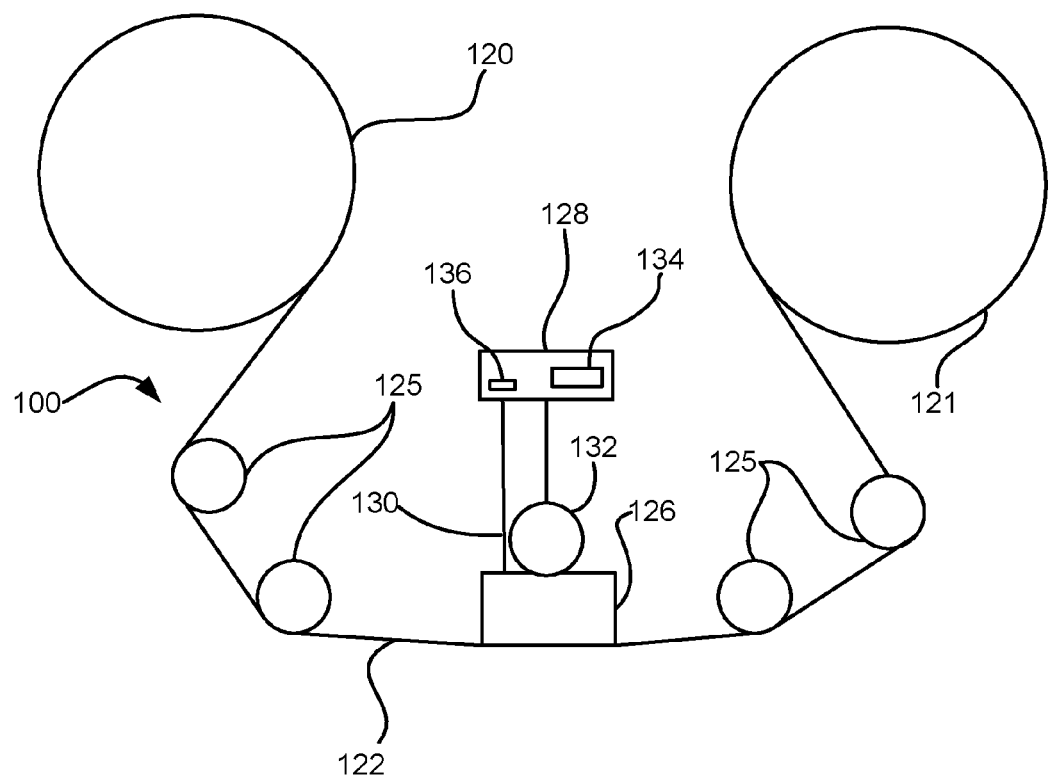
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
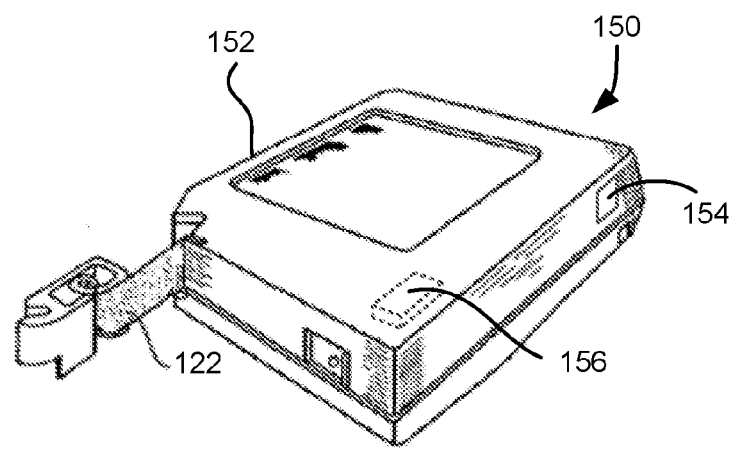
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
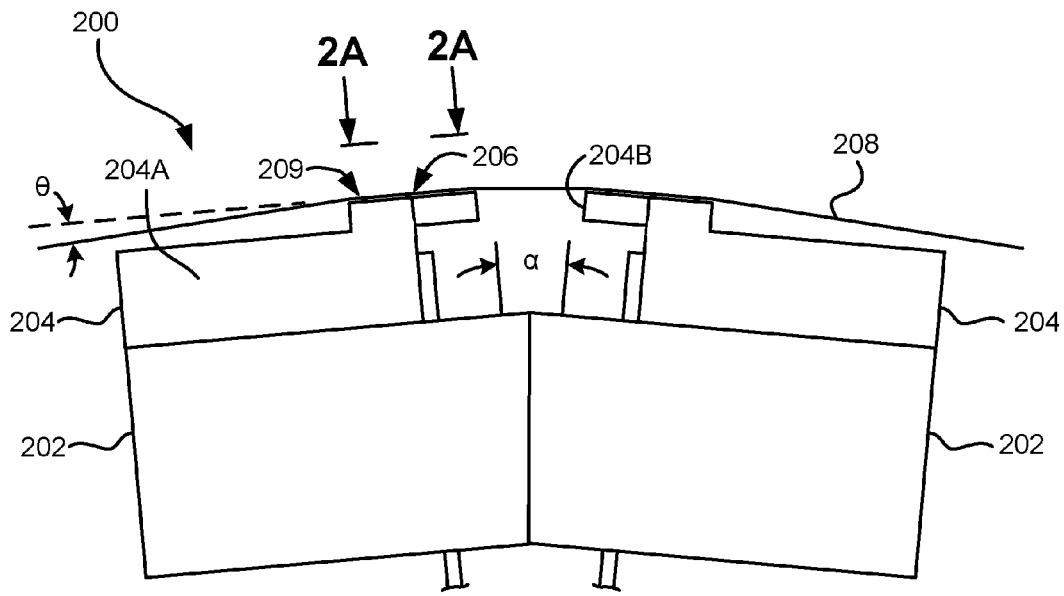
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
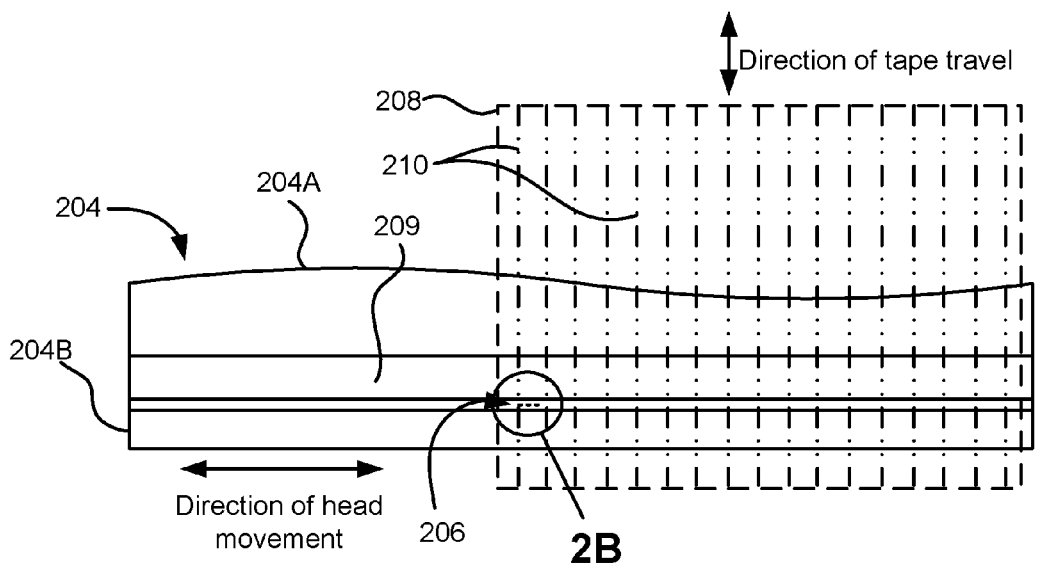
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
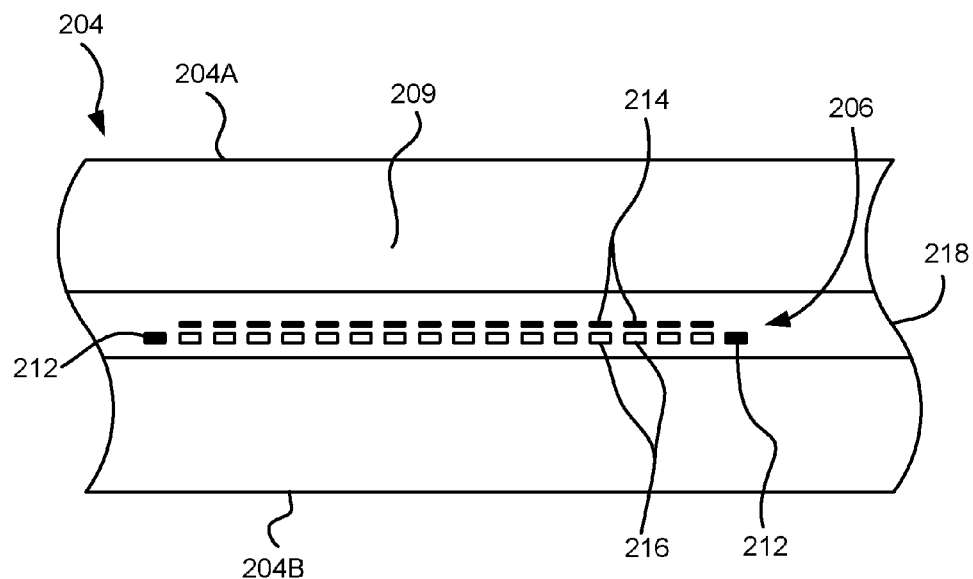
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
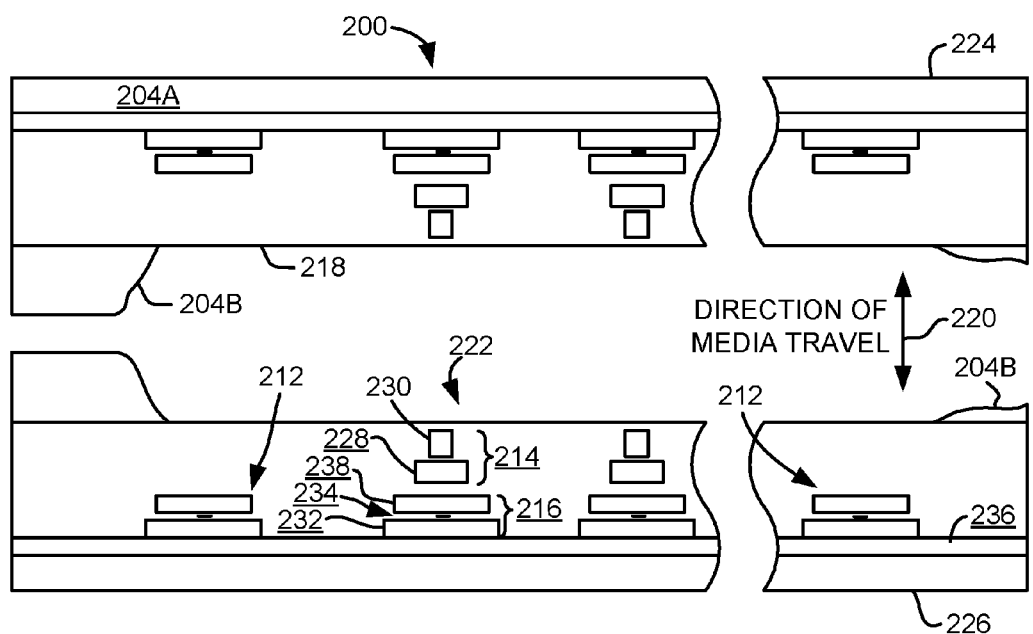
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
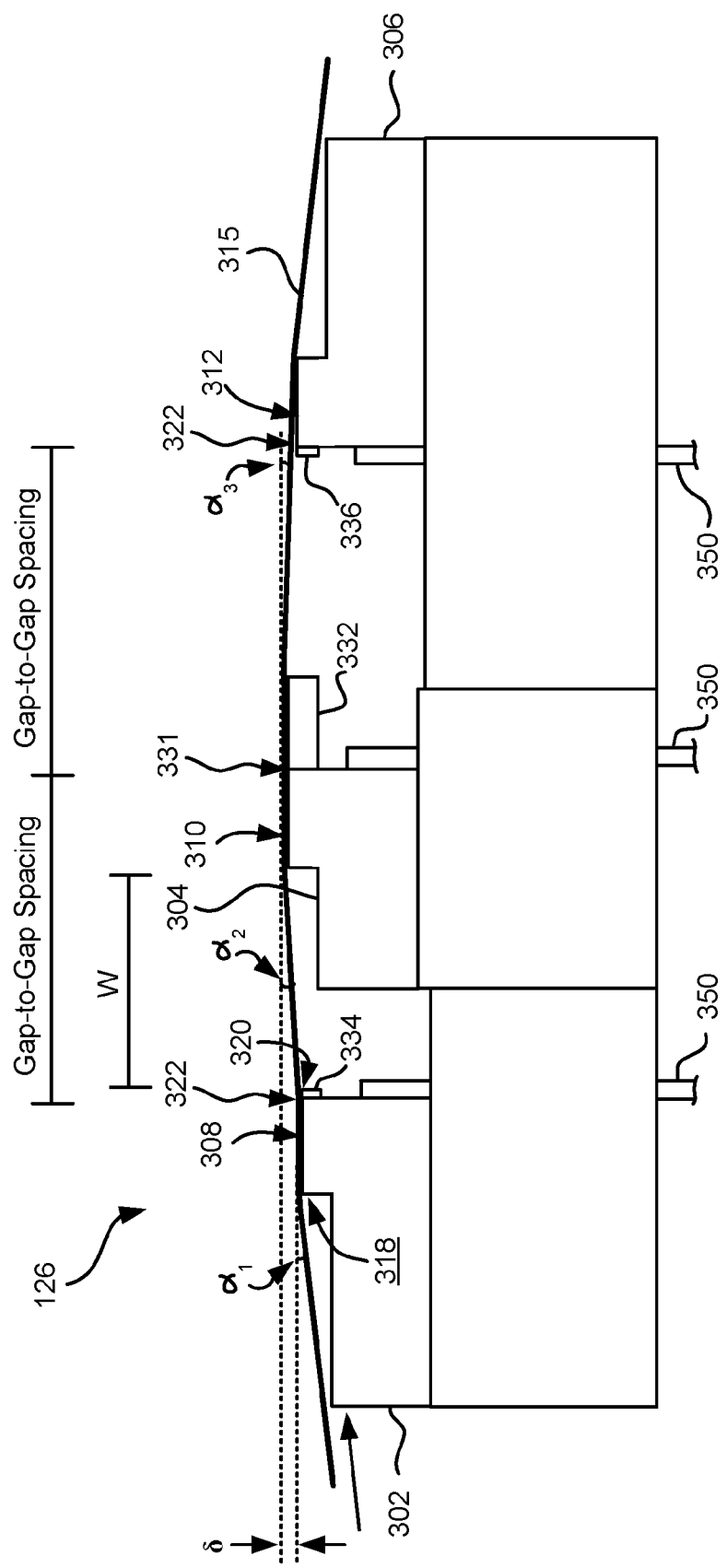
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
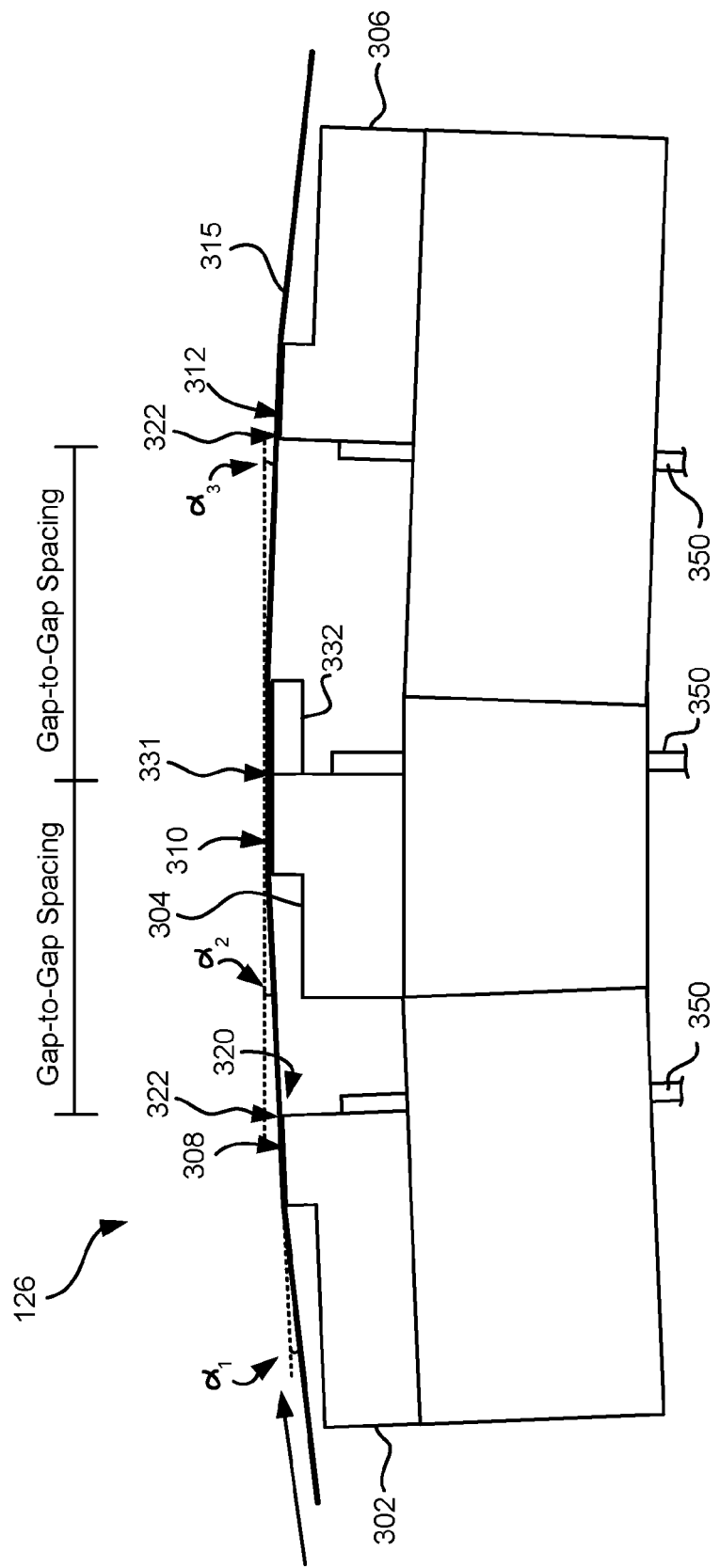
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
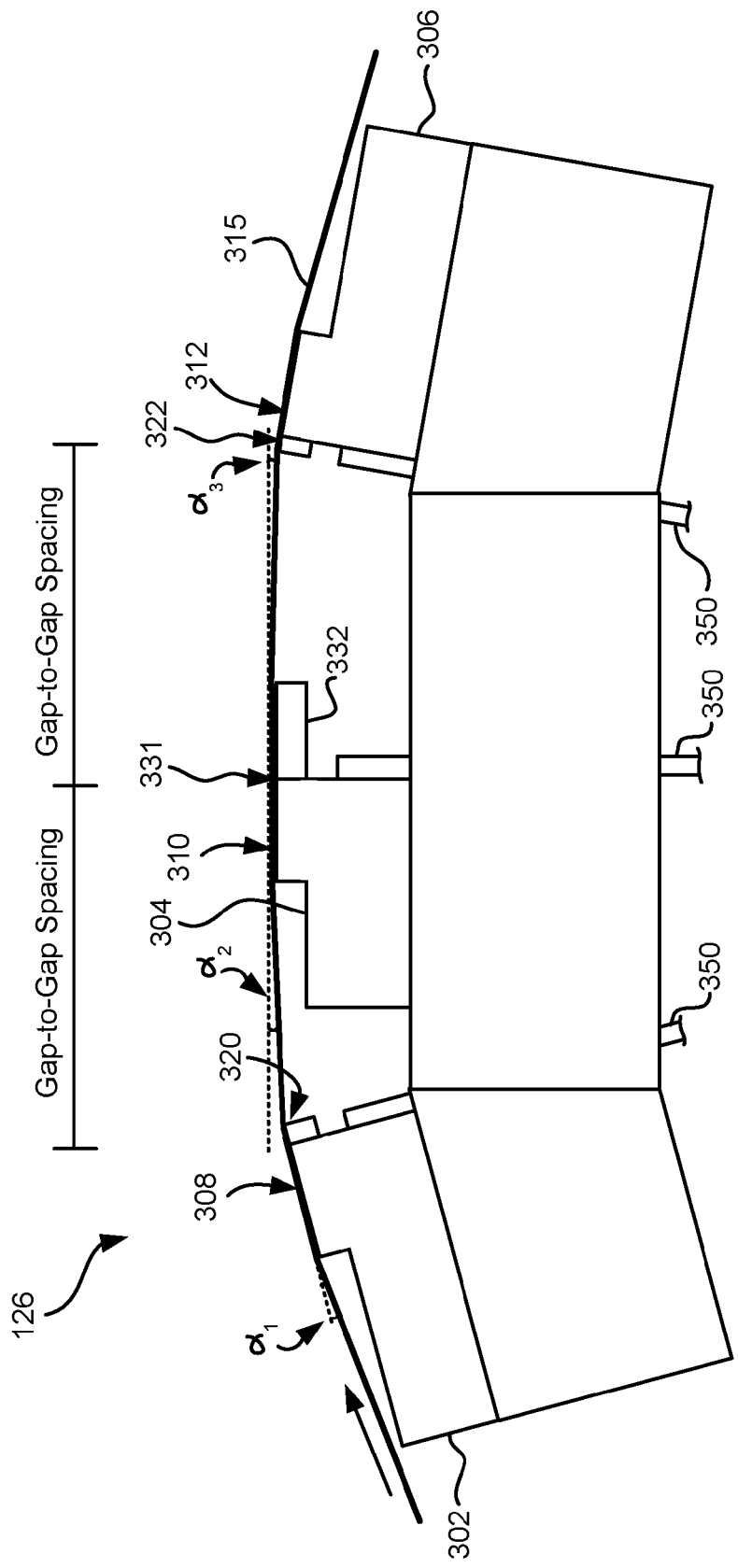
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

With continued reference to servo systems described herein, servo readers may experience shorting failures during writing operations. In particular, TMR sensors may be susceptible to shorting caused by deformation of the sensor thin films, e.g., due to dragging and/or plowing of conductive material across the sensor by asperities on a tape running thereacross, which causes "smearing" of the conductive material across the sensor, creating an electrical short thereacross. For example, even where a redundant pair of servo readers has been implemented in a servo system for positioning the write head during writing, a single shorting event across either of the servo readers may cause a loss of servo system functionality, thereby causing writing to stop. Because the deposition thickness of a tunnel barrier the TMR sensor is very thin, e.g., about 10 angstroms in some approaches, smearing of conductive material thereacross is a pervasive problem.

Various embodiments described herein include shorting resistant transducer structures that maintain servo system functionality, e.g., by preventing electrical shorting events that may be caused by tape asperities.

Figure 8:
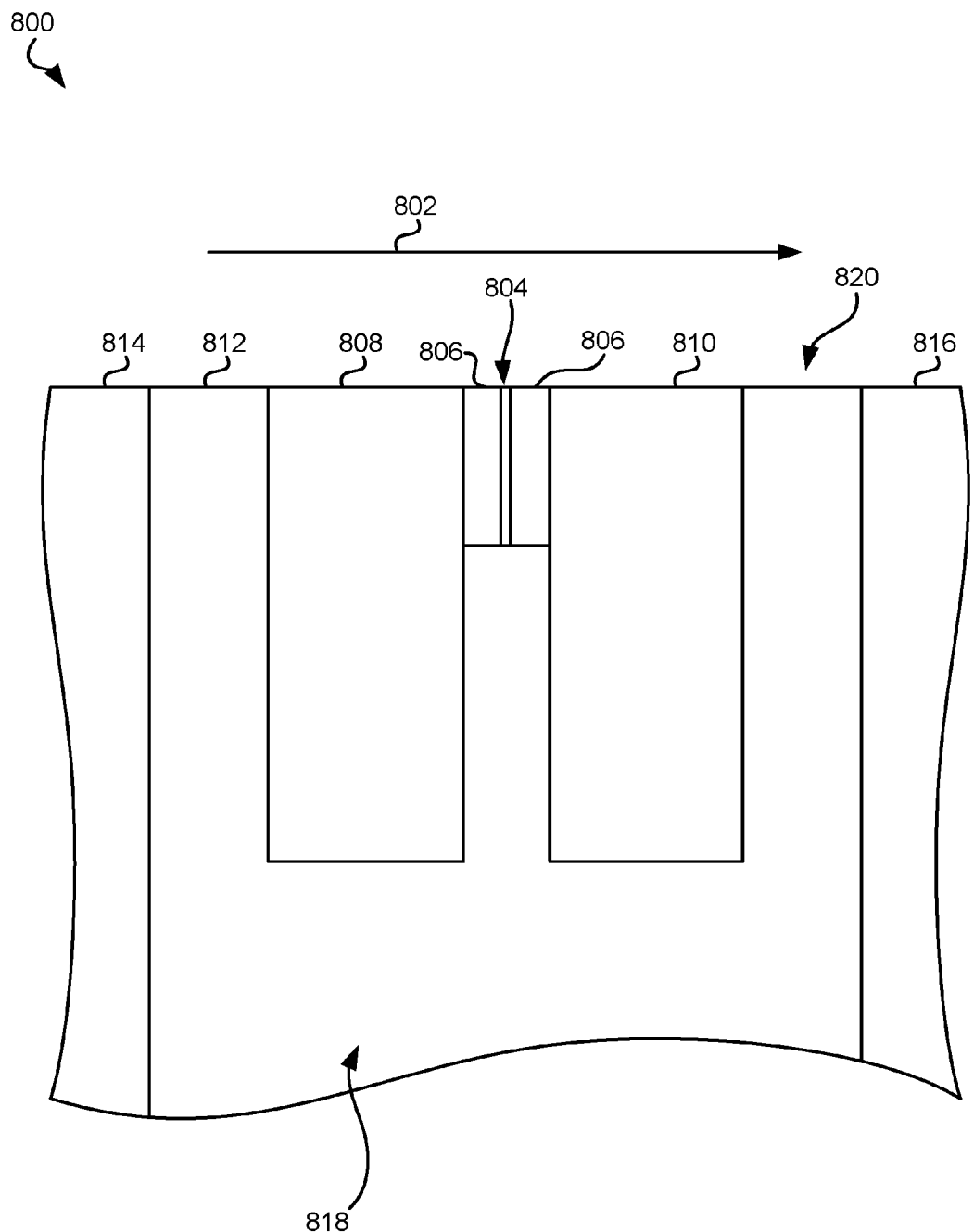
FIG. 8 is a partial side view of a magnetic read transducer, in accordance with one embodiment.

FIG. 8 depicts an apparatus 800 in accordance with one embodiment. As an option, the present apparatus 800 may be implemented in conjunction with features from any other embodiment listed herein, such as those described with reference to the other FIGS. Of course, however, such apparatus 800 and others presented herein may be used in various applications and/or in permutations which may or may not be specifically described in the illustrative embodiments listed herein. Further, the apparatus 800 presented herein may be used in any desired environment.

Apparatus 800 includes a magnetic read transducer 818 having a current perpendicular to plane sensor 804 and only a single magnetic shield 810. The sensor 804 may be configured as a servo sensor, e.g., a servo reader sensor or a (customer) data sensor. Moreover, according to various embodiments the sensor 804 may be a TMR sensor.

The magnetic read transducer 818 also includes a nonmagnetic, electrically conductive lead 808 that is in electrical communication with the sensor 804. Preferably, the lead 808 is metallic. Because the lead 808 is electrically conductive, lead 808 and magnetic shield 810 may act as leads for sensor 804, e.g., for passing a bias current therethrough. Examples of connectivity that may be adapted to enable the lead 808 to function as a lead are found in U.S. patent application Ser. No. 14/534,098, filed Nov. 5, 2014, which is herein incorporated by reference.

The single magnetic shield 810 is preferably positioned on a leading portion, e.g., to the right of the sensor 804 in FIG. 8, of the apparatus 800 with respect to an intended direction 802 of tape travel thereacross. Moreover, the nonmagnetic, metallic lead 808 may be positioned on an opposite side of the sensor 804 as the magnetic shield 810, e.g., as shown. The metallic lead 808 may preferably be a hard and/or dense refractory metal, e.g., Ir, Ru, Ta, etc. In some embodiments, the metallic lead 808 may be a conductive ceramic, such as ruthenium oxide, etc.

Magnetic materials, as used in the shield 810, may be more susceptible to smearing than hard and/or dense refractory metals. Thus, by including the metallic lead 808 having a relatively harder and/or denser refractory metal on the leading portion of the apparatus 800 with respect to a direction 802 of tape travel, e.g., rather than a relatively thick magnetic shield, asperities and/or clustered alumina particles on the tape are less likely to smear the conductive material from the metallic lead 808 across the sensor 804. As a result, read transducer 818 may desirable be less susceptible to shorting conditions which might otherwise cause an electrical short and/or loss of functionality of the apparatus 800 as a whole.

Furthermore, shorting events may be prevented in apparatus 800 due to the hard and/or dense refractory metallic lead 808 being more resistive to recess over time than the shield 810. As alluded to above, magnetic materials may be more susceptible to wear than hard and/or dense refractory metals. Thus, TMR heads having leading magnetic shields would be expected to experience an increased amount of wear-induced recession than embodiments presented herein having the metallic lead 808.

The metallic lead 808 and the shield 810 may each be separated from the sensor 804 by a respective conductive spacer layer 806. Note that in some embodiments, additional layers may be present. Except as otherwise described herein, the various components in this and other embodiments may be of conventional materials and/or design, as would be understood by one skilled in the art. Thus, the conductive spacer layers 806 may include, e.g., iridium, ruthenium, copper, a conductive material of a type known in the art, etc.

An insulative portion 812 of a conventional electrically insulative material surrounds read transducer 818. The insulative portion 812 may include, e.g., alumina, a dielectric insulation layer, an insulative material of a type known in the art, etc. Moreover, substrate 814 and closure 816 of types known in the art may sandwich insulative portion 812.

Electrical vias (not shown) may extend from respective pads, through the insulative portion 812 to the metallic lead 808 and the shield 810 for enabling application of a current thereto.

Including an alumina insulative portion 812 may also prevent wear of apparatus 800, due to the alumina insulative portion 812 being found to be wear resistant to clustered alumina particles.

Moreover, by implementing a hard and/or dense refractory metallic lead 808 on a leading side of the sensor 804, wear of the lead 808 may be reduced which would otherwise likely create an edge at a shield-spacer interface (the interface between 808 and 806), where the edge at the shield-spacer interface may present a higher contact pressure point for deforming the lead 808 and/or sensor 804. By implementing the hard and/or dense refractory metallic lead 808, some of the embodiments herein may be able to maintain read performance over extended periods of time, e.g., particularly in comparison to previous TMR heads.

Embodiments implementing a single magnetic shield 810 as opposed to two magnetic shields are preferably able to accurately read data from a tape despite a reduced amount of shielding during read operations. This may be achieved by implementing equalization processes in the decoding channel of the controller that processes the signal from the sensor 804. Equalization processes may include any known processes which would be apparent to one skilled in the art upon reading the present description.

Referring still to FIG. 8, the magnetic read transducer 818 may be positioned on a first module, e.g., see the modules of FIGS. 2 and 4-7. The first module may be oriented relative to a second module such that a magnetic recording tape contacts a tape bearing surface 820 of the first module at the shield 810, e.g., contacts the shield 810 itself, contacts an overcoat above the shield 810, etc., when the magnetic recording tape travels in a first direction from the first module towards the second module, e.g., direction 802. It follows that the shield 810 is preferably positioned between the sensor 804 and the second module along the first direction while the nonmagnetic, metallic lead 808 is positioned upstream of the sensor 804, such that dragging and/or plowing of conductive material across the sensor 804 is minimized.

According to an example, which is in no way intended to limit the invention, consider FIG. 5, and assume the outer modules 302, 306 are writing modules each having an array of writers with servo readers flanking each array. See, e.g., FIG. 3 showing a W-R-W configuration. The leading module 302 of FIG. 5 may be considered the "first module" while middle module 304 may be considered the "second module". According to the present example, the magnetic recording tape 315 contacts a tape bearing surface 308 of the leading (first) module 302 in FIG. 5 when the tape is traveling from the leading (first) module 302 towards the middle (second) module 304. Thus, a shield is preferably positioned between each servo sensor of the leading (first) module 302 and the middle (second) module 304 while a nonmagnetic, metallic lead is positioned upstream (to the left) of each servo sensor of the leading (first) module 302. In doing so, the nonmagnetic, metallic lead is able to minimize or prevent dragging and/or plowing of conductive material across the servo sensor of the leading (first) module 302. The third module 306 has a similar structure, with a nonmagnetic, metallic lead to the right of each servo sensor and a shield to the left of each servo sensor.

Referring again to FIG. 8, the first module may furthermore be oriented relative to a second module such that a magnetic recording tape does not contact the tape bearing surface 820 of the first module at the shield 810 when the magnetic recording tape travels in a second direction opposite the first direction, e.g., which may be opposite of direction 802. Therefore, dragging and/or plowing of conductive material across the sensor 804 is again avoided as the magnetic recording tape may pass over the sensor 804 altogether when traveling in a second direction opposite the first direction.

According to another example, which again is in no way intended to limit the invention, the trailing module 306 of FIG. 5 may be considered the "first module" while middle module 304 may be considered the "second module". According to the present example, the magnetic recording tape 315 does not contact the tape bearing surface 312 of the trailing (first) module 306 in FIG. 5 when the tape is traveling from the middle (second) module 304 towards the trailing (first) module 306. Again it follows that a magnetic shield is preferably positioned between a sensor of the trailing (first) module 306 and the middle (second) module 304 along a direction of tape travel.

A third module may be positioned on an opposite side of the second module as the first module. The third module may have a second magnetic read transducer having a sensor and a single magnetic shield, e.g., as seen in FIG. 8. The shield of the second magnetic read transducer is preferably positioned between the sensor and the second module along a direction of tape travel. Moreover, according to one approach, the second magnetic read transducer of the third module may have a nonmagnetic, metallic lead in electrical communication with the sensor. The nonmagnetic metallic lead may be positioned on an opposite side of the sensor as the shield.

According to various embodiments, the first, second and third modules may be configured in a read-write-read module configuration, e.g. as depicted in FIG. 4, on a magnetic head. In such embodiments, the apparatus may be configured to pass tape across the nonmagnetic, metallic lead before the tape is passed over the sensor portion and/or magnetic shield, e.g., to prevent conductive material from being smeared across the sensor and thereby causing a loss and/or degradation of functionality in the apparatus. In one exemplary embodiment, with reference to FIG. 7, assume the outer modules 302, 306 are reading modules and the middle module 304 is the writing module. If the leading angle $\alpha_1$ is changed to be negative (from the positive angle shown), the tape will fly over the leading module 302, be written by middle module 304, and read back by the readers of the trailing module 306. In such example, nonmagnetic metallic leads are positioned between the middle module and the sensors of the outer modules. In this example, the relative locations of the nonmagnetic metallic leads and shields of each sensor are the reverse of that specified above in the illustrative example discussed with reference to FIGS. 5 and 8.

The first, second and third modules may, according to another embodiment, be configured in a write-read-write module configuration, e.g. as depicted in FIG. 3, on a magnetic head. In such embodiments, the apparatus may be configured to pass tape across the nonmagnetic, metallic lead before the tape is passed over the sensor portion and/or magnetic shield, e.g., again to prevent conductive material from being carried across the sensor and thereby causing a loss of functionality in the apparatus. See, e.g., illustrative example discussed above with reference to FIGS. 5 and 8.

According to further embodiments, at least one magnetic read transducer may be positioned on a second module having an array of data writers and being positioned between a first module and a third module. The at least one magnetic read transducer may be positioned to read a servo track during writing operations, e.g., to ensure proper head alignment with respect to data tracks on a tape being written to. Accordingly, the second module may not include any data readers (e.g., to read data tracks), but may include one or more servo readers which are configured to read one or more servo tracks.

Figure 9:
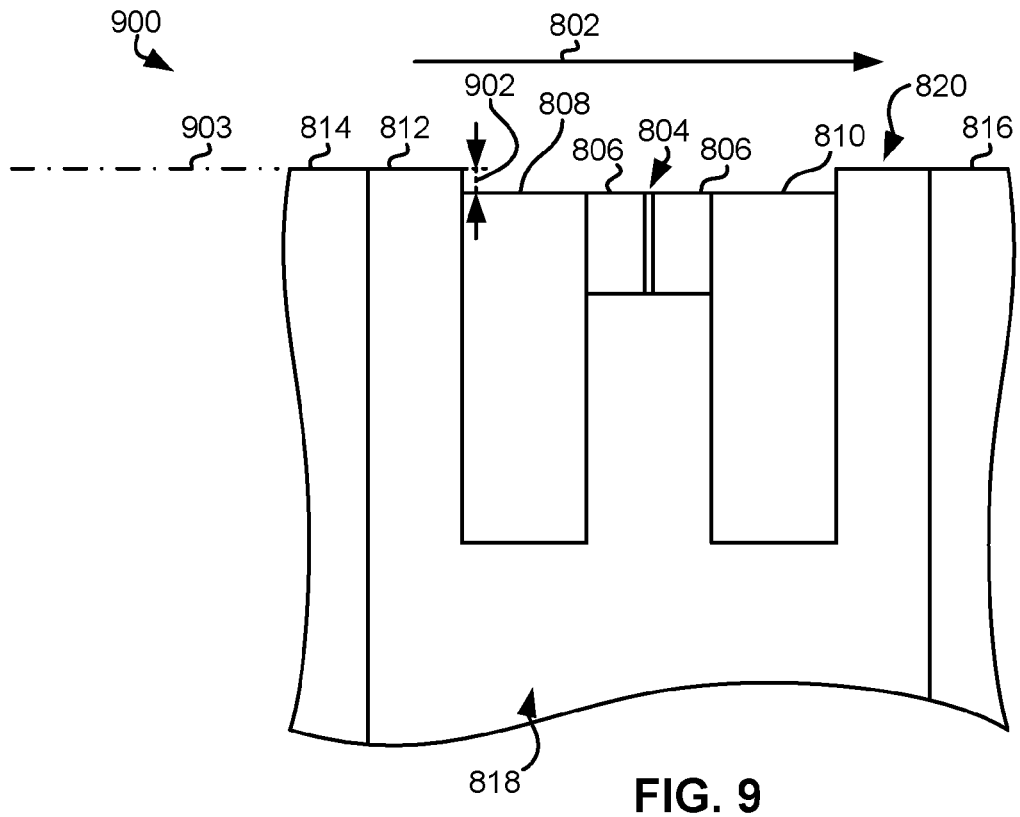
FIG. 9 is a partial side view of a magnetic read transducer, in accordance with one embodiment.

Referring now to FIG. 9, an apparatus 900 is depicted in accordance with one embodiment. As an option, the present apparatus 900 may be implemented in conjunction with features from any other embodiment listed herein, such as those described with reference to the other FIGS., such as FIGS. 2-8. Specifically, FIG. 9 illustrates variations of the embodiment of FIG. 8 depicting an exemplary configuration within an apparatus 900. Accordingly, various components of FIG. 9 have common numbering with those of FIG. 8.

Note that such apparatus 900 and others presented herein may be used in various applications and/or in permutations which may or may not be specifically described in the illustrative embodiments listed herein. Further, the apparatus 900 presented herein may be used in any desired environment. Thus FIG. 9 (and the other FIGS.) may be deemed to include any possible permutation.

Referring now to FIG. 9, portions of the magnetic read transducer 818 of apparatus 900 may be recessed away from the plane 903 of the tape bearing surface 820 (e.g., a media facing surface of the apparatus 900) to further prevent wear.

Apparatus 900 includes a magnetic read transducer 818 which has been recessed. The recessed portions of the magnetic read transducer 818 may include the metallic lead 808, the conductive spacer layers 806, the sensor 804 and the magnetic shield 810. The recessed portions are recessed in a direction substantially perpendicular to the intended direction 802 of tape travel, and away from the plane 903 of the tape bearing surface 820.

The recessed portions may be recessed a depth 902 from the tape bearing surface 820 to define a negative edge. The recession depth 902 may be selected by a designer. Known processes may be used to create the recession.

According to other embodiments, more or fewer of the portions of the magnetic read transducer 818 may be recessed. For example, in one embodiment, only the sensor 804 may be recessed from the tape bearing surface 820 by a desired amount.

In an alternative embodiment, in order to prevent conductive material from being carried across the sensor and thereby cause a loss of functionality in the apparatus, the thickness of a magnetic shield on the leading side of a sensor relative to an intended direction of tape travel may be reduced relative to the trailing shield.

Figure 10:
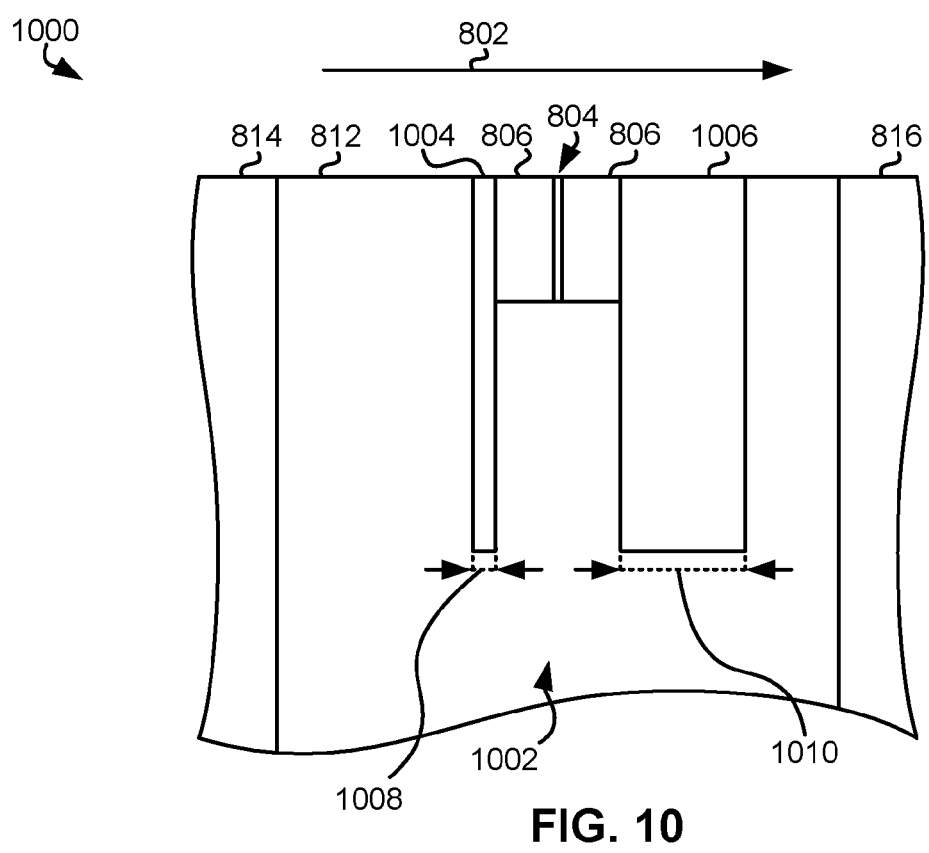
FIG. 10 is a partial side view of a magnetic read transducer, in accordance with one embodiment.

FIG. 10 depicts an apparatus 1000 having a thin leading magnetic shield in accordance with one embodiment. As an option, the present apparatus 1000 may be implemented in conjunction with features from any other embodiment listed herein, such as those described with reference to the other FIGS. Of course, however, such apparatus 1000 and others presented herein may be used in various applications and/or in permutations which may or may not be specifically described in the illustrative embodiments listed herein. Further, the apparatus 1000 presented herein may be used in any desired environment.

Apparatus 1000 includes a magnetic read transducer 1002 having a sensor 804, a first magnetic shield 1006, and a second magnetic shield 1004. The sensor 804 may preferably be configured as a servo sensor. According to various embodiments the sensor may be a TMR sensor.

A portion of the second magnetic shield 1004 aligned with the sensor 804 in an intended direction 802 of tape travel thereacross may have a thickness 1008 along the intended direction 802 of tape travel that is less than a thickness 1010 of a portion of the first magnetic shield 1006 aligned with the portion of the second magnetic shield 1004 in the intended direction 802 of tape travel. Preferably, the thickness 1008 of the second magnetic shield 1004 is 50% or less than the thickness of the first magnetic shield 1006, and in some embodiments 40% or less. Note that the thickness 1010 of the first magnetic shield 1006 may be in a range of about 5 to about 10 times a spacing between data transitions that the apparatus 1000 is configured to write on a magnetic recording tape.

The thickness 1008 of the second magnetic shield 1004 may be between about 0.5 times and about 3 times a spacing between data transitions that the apparatus 1000 is configured to write on a magnetic recording tape, e.g. see tape 122 of FIGS. 1A-1B. According to preferred embodiments, the thickness 1008 of the second magnetic shield 1004 may be less than 12 nm. Furthermore, the second magnetic shield 1004 may preferably include CZT, other low ductility metal and/or laminations, etc.

Including a second magnetic shield 1004 having a reduced thickness 1008 as described herein may reduce the probability of asperities on the tape from plowing and/or smearing conductive material across the sensor 804. This result may be achieved by reducing the amount of conductive material that the tape is exposed to prior to passing over the sensor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
   an array of current perpendicular to plane magnetic read transducers, each read transducer having a sensor and only a single magnetic shield, each of the magnetic read transducers has a nonmagnetic metallic lead in electrical communication with the sensor, the nonmagnetic metallic lead being positioned on an opposite side of the sensor as the shield, wherein the nonmagnetic metallic lead of each of the magnetic read transducers is constructed of a refractory metal, wherein the refractory metal is relatively harder and/or denser than the material of the single magnetic shield.

2. An apparatus as recited in claim 1, wherein each of the sensors is configured as a servo sensor.

3. An apparatus as recited in claim 1, wherein each magnetic read transducer is positioned on a first module, and comprising a second module, wherein the first module is oriented relative to the second module such that a magnetic recording tape contacts a tape bearing surface of the first module at the shield when the magnetic recording tape travels in a first direction from the first module towards the second module and does not contact the tape bearing surface of the first module at the shield when the magnetic recording tape travels in a second direction opposite the first direction, wherein the shield is positioned between the sensor and the second module along the first direction.

4. An apparatus as recited in claim 3, comprising a third module positioned on an opposite side of the second module as the first module, the third module having a second magnetic read transducer having a sensor and a single magnetic shield, wherein the shield of the second magnetic read transducer is positioned between the sensor and the second module along the second direction.

5. An apparatus as recited in claim 4, wherein the second magnetic read transducer has a nonmagnetic metallic lead in electrical communication with the sensor, the nonmagnetic metallic lead being positioned on an opposite side of the sensor as the shield.

6. An apparatus as recited in claim 1, wherein each of the magnetic read transducers is positioned on at least one of two outer modules, a middle module being positioned between the outer modules, wherein the at least one outer module includes an array of data readers, wherein the magnetic read transducer is one of the data readers.

7. An apparatus as recited in claim 6, wherein the middle modules does not include any data readers.

8. An apparatus as recited in claim 1, wherein the nonmagnetic metallic lead of each of the magnetic read transducers is constructed of a conductive ceramic.

9. An apparatus, comprising:
a current perpendicular to plane magnetic read transducer having a sensor and only a single magnetic shield,
wherein the sensor is a tunnel magnetoresistive sensor,
wherein the magnetic read transducer has a nonmagnetic metallic lead in electrical communication with the sensor, the nonmagnetic metallic lead being positioned on an opposite side of the sensor as the shield, wherein the nonmagnetic metallic lead of the magnetic read transducer is constructed of a refractory metal, wherein the refractory metal is relatively harder and/or denser than the material of the single magnetic shield.

10. An apparatus as recited in claim 9, wherein the tunnel magnetoresistive sensor includes a reference layer, a tunnel barrier layer directly on the reference layer, and a free layer directly on the tunnel barrier layer.

11. An apparatus, comprising:
an array of current perpendicular to plane magnetic read transducers, each of the read transducers having a sensor and only a single magnetic shield,
a drive mechanism for passing a magnetic medium over each of the magnetic read transducers, and
a controller electrically coupled to each of the magnetic read transducers, wherein each magnetic read transducer has a nonmagnetic metallic lead in electrical communication with the sensor, the nonmagnetic metallic lead being positioned on an opposite side of the sensor as the shield, wherein the nonmagnetic metallic lead of each of the magnetic read transducers is constructed of a refractory metal, wherein the refractory metal is relatively harder and/or denser than the material of the single magnetic shield.

* * * * *